(12) United States Patent
Dimov

(10) Patent No.: US 10,860,346 B2
(45) Date of Patent: Dec. 8, 2020

(54) SERVER-SIDE INTERNATIONALIZATION FRAMEWORK FOR WEB APPLICATIONS

(71) Applicant: SAP SE, Walldorf (DE)

(72) Inventor: Stefan Dimov, Mountain View, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/677,291

(22) Filed: Aug. 15, 2017

(65) Prior Publication Data

US 2019/0056961 A1    Feb. 21, 2019

(51) Int. Cl.
*G06F 9/451* (2018.01)
*G06F 16/951* (2019.01)
*G06F 16/958* (2019.01)
*G06F 40/58* (2020.01)
*G06F 40/263* (2020.01)

(52) U.S. Cl.
CPC ............ *G06F 9/454* (2018.02); *G06F 16/951* (2019.01); *G06F 16/958* (2019.01); *G06F 40/263* (2020.01); *G06F 40/58* (2020.01)

(58) Field of Classification Search
CPC .... G06F 9/4448; G06F 17/24; G06F 17/2247; G06F 17/289; G06F 17/2785; G06F 9/454; G06F 16/958; G06F 16/951; G06F 17/275; G06F 704/008; H04L 29/08072; H04L 29/06
See application file for complete search history.

(56) References Cited

U.S. PATENT DOCUMENTS

| | | | | |
|---|---|---|---|---|
| 6,865,716 | B1* | 3/2005 | Thurston | G06F 17/30876 704/8 |
| 7,072,934 | B2* | 7/2006 | Helgeson | G06F 9/468 709/203 |
| 8,548,909 | B1* | 10/2013 | Snow | G06F 17/30896 705/42 |
| 9,032,303 | B2* | 5/2015 | Hall | G06F 21/31 715/740 |
| 9,645,983 | B1* | 5/2017 | Tuan | G06F 17/30899 |
| 9,684,733 | B2* | 6/2017 | Niddapu | G06F 17/30905 |
| 9,961,154 | B1* | 5/2018 | Kemp | H04L 67/28 |
| 2001/0044810 | A1* | 11/2001 | Timmons | G06F 17/30864 715/207 |

(Continued)

*Primary Examiner* — Fariba Sirjani
(74) *Attorney, Agent, or Firm* — Buckley, Maschoff & Talwalkar LLC

(57) ABSTRACT

A server receives a web-protocol request from a client that triggers a server-side operation in response to the request. Based on a result of the operation, the server identifies first text information to be returned to the client. A language associated with the client device is determined. A determination is made as to whether a resource file corresponding to the determined language is loaded in a volatile memory on the server. In a case where a resource file corresponding to the determined language is not loaded in the volatile memory, the resource file corresponding to the determined language is loaded from a non-volatile memory into the volatile memory on the server. Second text information which corresponds to the first text information to be returned to the client device is retrieved from the resource file in the volatile memory. The second text information is transmitted to the client.

17 Claims, 7 Drawing Sheets

(56) References Cited

U.S. PATENT DOCUMENTS

| | | | | |
|---|---|---|---|---|
| 2003/0005159 A1* | 1/2003 | Kumhyr | G06F 17/3089 | 709/246 |
| 2003/0074481 A1* | 4/2003 | Fox | G06F 17/30905 | 719/310 |
| 2003/0135501 A1* | 7/2003 | Frerebeau | G06F 17/272 | |
| 2004/0128614 A1* | 7/2004 | Andrews | G06F 17/289 | 715/205 |
| 2004/0199497 A1* | 10/2004 | Timmons | G06F 17/30864 | |
| 2005/0055290 A1* | 3/2005 | Bross | G06Q 30/06 | 705/31 |
| 2005/0066315 A1* | 3/2005 | Nguyen | G06F 9/454 | 717/136 |
| 2005/0240393 A1* | 10/2005 | Glosson | G06F 40/166 | 704/8 |
| 2007/0101341 A1* | 5/2007 | Downing | G06F 9/544 | 719/314 |
| 2007/0156842 A1* | 7/2007 | Vermeulen | H04L 29/06047 | 709/217 |
| 2008/0086454 A1* | 4/2008 | Bahadori | G06F 17/3089 | |
| 2008/0104618 A1* | 5/2008 | Rogers | G09B 5/00 | 719/328 |
| 2008/0201118 A1* | 8/2008 | Luo | G06F 17/2247 | 703/2 |
| 2008/0221867 A1* | 9/2008 | Schreiber | G06F 9/454 | 704/8 |
| 2008/0222610 A1* | 9/2008 | Joshi | G06F 11/3688 | 717/126 |
| 2008/0313660 A1* | 12/2008 | Malik | H04L 67/02 | 719/330 |
| 2009/0199172 A1* | 8/2009 | Zhong | G06F 9/454 | 717/168 |
| 2009/0282385 A1* | 11/2009 | Boland | G06F 16/958 | 717/106 |
| 2010/0146110 A1* | 6/2010 | Christensen | G06Q 30/02 | 709/224 |
| 2011/0131212 A1* | 6/2011 | Shikha | G06F 17/2229 | 707/741 |
| 2012/0151119 A1* | 6/2012 | Yoshida | G06F 12/0638 | 711/102 |
| 2013/0157626 A1* | 6/2013 | Taiwan | H04L 51/16 | 455/413 |
| 2013/0226554 A1* | 8/2013 | Dillard | G06F 17/289 | 704/2 |
| 2013/0262080 A1* | 10/2013 | Marciano | G06F 17/2836 | 704/3 |
| 2013/0318331 A1* | 11/2013 | Sasaoka | G06F 9/4812 | 712/225 |
| 2014/0006548 A1* | 1/2014 | Tsolis | H04L 67/04 | 709/217 |
| 2014/0189197 A1* | 7/2014 | Krithivas | G06F 12/0246 | 711/103 |
| 2014/0280515 A1* | 9/2014 | Wei | H04L 67/02 | 709/203 |
| 2014/0365865 A1* | 12/2014 | Ivory | G06F 17/2247 | 715/234 |
| 2015/0074224 A1* | 3/2015 | Kleinhout | H04L 67/02 | 709/217 |
| 2015/0206189 A1* | 7/2015 | Norwood | G06Q 30/0261 | 705/14.58 |
| 2015/0309993 A1* | 10/2015 | Wilde | H04L 67/02 | 715/703 |
| 2015/0324336 A1* | 11/2015 | Glezos | G06F 16/951 | 715/234 |
| 2015/0381403 A1* | 12/2015 | Venaglia | H04W 4/50 | 709/220 |
| 2016/0004676 A1* | 1/2016 | Goto | G06F 17/30902 | 715/234 |
| 2016/0062965 A1* | 3/2016 | Bostick | G06F 17/2223 | 704/9 |
| 2016/0191631 A1* | 6/2016 | Haraszti | H04L 67/14 | 709/227 |
| 2017/0153971 A1* | 6/2017 | Fan | G06F 11/3692 | |
| 2017/0161240 A1* | 6/2017 | Lee | G06F 17/272 | |
| 2017/0168959 A1* | 6/2017 | Dodonov | G06F 17/30902 | |
| 2017/0171345 A1* | 6/2017 | Borah | H04L 67/2842 | |
| 2017/0212663 A1* | 7/2017 | Breedvelt-Schouten | G06F 3/04842 | |
| 2018/0095962 A1* | 4/2018 | Anderson | G06F 16/243 | |
| 2018/0152565 A1* | 5/2018 | Wang | H04N 1/00039 | |
| 2018/0167268 A1* | 6/2018 | Liguori | H04L 67/2814 | |
| 2018/0225285 A1* | 8/2018 | Anglin | G06F 17/2854 | |
| 2018/0246983 A1* | 8/2018 | Rathod | G06F 17/30864 | |
| 2018/0324272 A1* | 11/2018 | Toal | H04L 67/2842 | |
| 2018/0332142 A1* | 11/2018 | Ashby | G06F 9/44557 | |
| 2018/0341377 A1* | 11/2018 | Kataria | G06F 8/65 | |

* cited by examiner

SERVER-SIDE INTERNATIONALIZATION FRAMEWORK FOR WEB APPLICATIONS

BACKGROUND

Internationalization ("i18n") and localization ("l10n") are two beneficial aspects of creating worldwide applications that function for different cultures, languages, and locations. Internationalization relates to the process of planning and implementing a product or service (e.g., a software application) so that it can be adapted to various languages and regions without having to make engineering changes to the source code. Localization relates to the process of adapting internationalized software for a specific region or language by adding locale-specific components and translating text.

Internationalization of web applications can be a resource-intensive processes, as it typically requires inefficient use of client resources. In conventional approaches, a client downloads all known translated text strings in multiple languages from a server in the form of a sizeable resource library. Of the downloaded library, typically only a small fraction of the translated text strings is later retrieved by the client for use. For example, the client may download hundreds or thousands of translated text strings, which it later searches through in order to retrieve, for instance, only one translated text string needed for a web application message. Many of the languages provided by the resource library also remain unnecessary and unused by the client. As an application expands, the number of translated text strings in the resource library also expands, and the client can become overloaded or suffer performance degradation.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
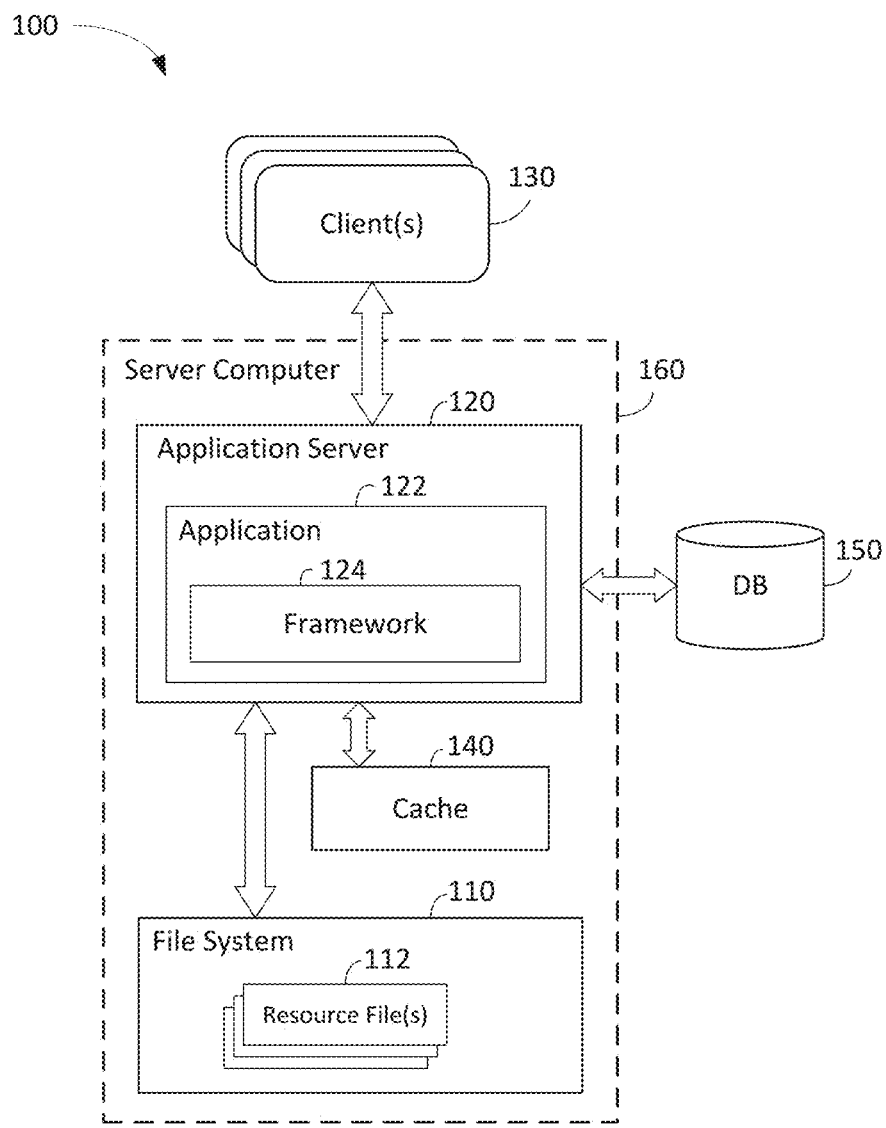
FIG. 1 is a block diagram of a system according to some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The disclosed embodiments relate to internationalization of web applications, and more specifically, to a server-side internationalization framework that facilitates the translation of server-side response messages in a web application environment. The framework provides for the ability to extend applications to global users with ease. For example, the framework may be utilized in the context of multilingual applications that may be used by multiple users submitting requests and expecting replies in different languages.

In some embodiments, a server-side framework is provided that loads into memory the required i18n resources on demand and provides to a user interface localized and interpolated text information by user request.

Among other things, the framework in the disclosed embodiments allow for caching and reuse of dynamically created server-side text information in an efficient manner, reducing the amount of resources required by web and/or application servers and clients.

FIG. 1 is a block diagram of system 100 according to some embodiments. System 100 includes local file system 110, application server 120, client(s) 130, cache 140, and database 150. Database 150 is provided by a database server which may be hosted by server computer 160 or on a separate physical computer in communication with server computer 160.

Application framework 124, coupled to server application 122, is executable in the server 120 and arranged to access a local memory 140 on the server for caching data. Application framework 124 includes different application programming interfaces (APIs), which performs a variety of functions in response to API calls from application 122. In an example embodiment, the application framework 124 includes an internationalization (i18n) framework API, which provides programmatic access between server application 122 and client(s) 130.

File system 110 and database 150 are embodied as non-volatile (e.g., disk-based) memory. Independent language resource files 112 are persisted in local file system 110 of server computer 160 and accessed during operation when needed.

Server-side text information (also herein referred to as a "text message" or "text") that are to be seen by a user at client 130 (e.g., on a Web browser) is externalized in the resource files 112, one file per supported language.

The resource files (e.g., comma-separated value (CSV) files) 112 are used to store mappings between text keys and text information, pre-translated in the corresponding language. Each language has its own resource file. All the resource files contain the same keys and those keys are mapped to the same text information, pre-translated in different languages. In software code, text information to be displayed is replaced by the text key corresponding to the text information. Server-side code utilizes those text keys instead of the actual text.

Local memory 140 on the server is embodied as volatile (e.g., non-disk-based) memory (e.g., random access memory (RAM), static random-access memory (SRAM), and dynamic random-access memory (DRAM)), which may function as a cache 140. Cache 140 may locally cache data stored in file system 110 for faster access by application server 120. For example, certain language resource files may be dynamically loaded (e.g., by request) from file system 110 into the cache 140 for quick access by a processor of application server 120.

Generally, application server 120 receives queries from client(s) 130 and provides results to client(s) 130 based on data of file system 110 and/or database 150. Application server 120 executes and provides services to application 122. Application 122 may comprise server-side executable program code (e.g., compiled code, scripts, etc.) which provide functionality to client(s) 130 by providing user interfaces to client(s) 130, receiving requests from client(s) 130, retrieving data from file system 110 and/or database 150 based on the requests, processing the data received from file system 110 and/or database 150, and providing the processed data to client(s) 130. Application 122 may be made available for execution by application server 120 via registration and/or other procedures which are known in the art.

Application server 120 provides any suitable interfaces through which client(s) 130 may communicate with application 122 executing on application server 120. For example, application server 120 may include a HyperText Transfer Protocol (HTTP) interface supporting a transient request/response protocol over Transmission Control Protocol (TCP), a WebSocket interface supporting non-transient full-duplex communications between application server 120 and any client(s) 130 which implement the WebSocket protocol over a single TCP connection, and/or an Open Data Protocol (OData) interface.

Presentation of a user interface may comprise any degree or type of rendering, depending on the type of user interface code generated by application server 120. For example, a client 130 may execute a Web browser to request and receive a Web page (e.g., in HTML format) from application server 120 via HTTP, HTTPS, and/or WebSocket, and may render and present the Web page according to known protocols. One or more of client(s) 130 may also or alternatively present user interfaces by executing a standalone executable file (e.g., an .exe file) or code (e.g., a JAVA applet) within a virtual machine.

Figure 2:
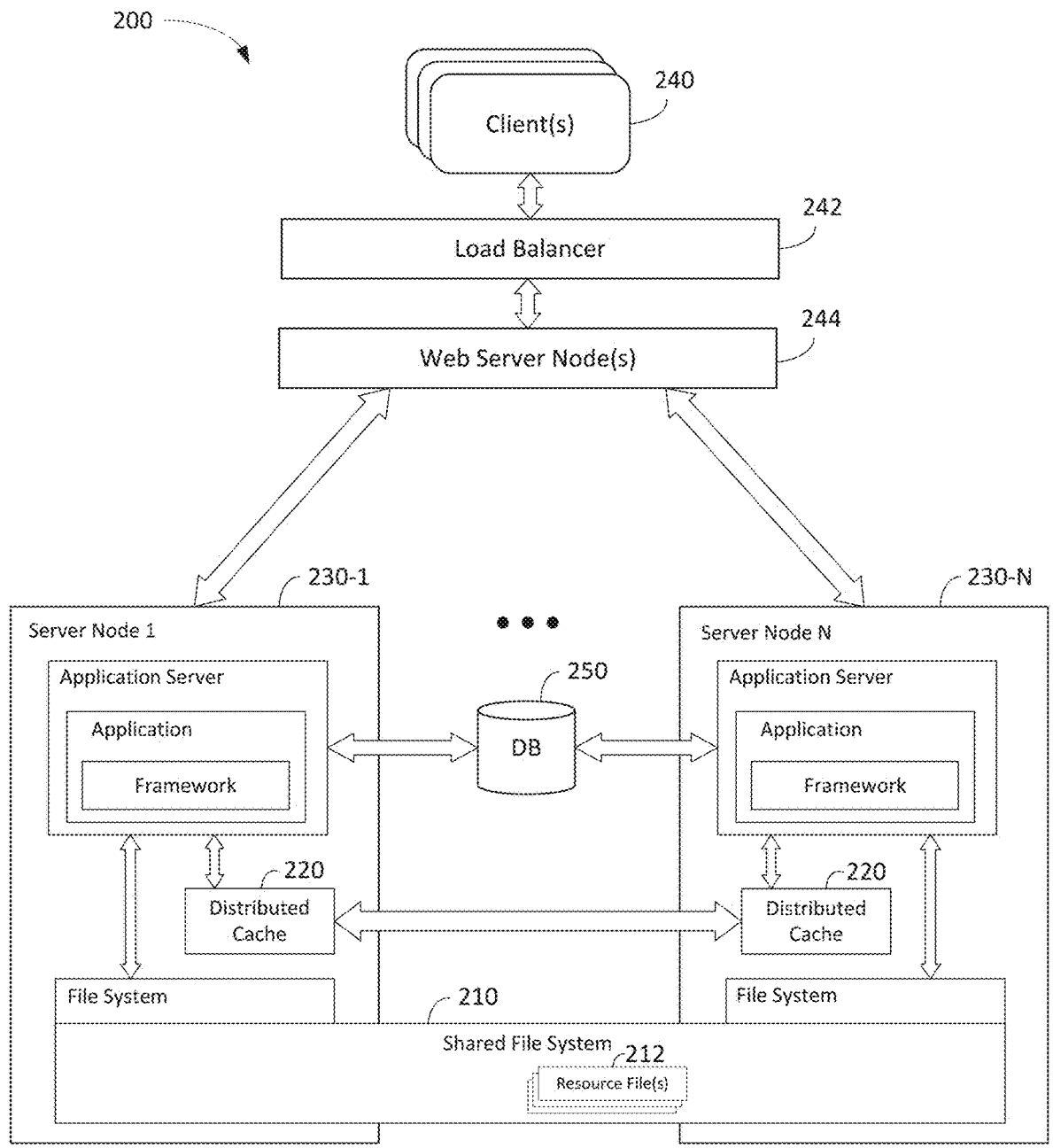
FIG. 2 is a block diagram of a system according to some embodiments.

FIG. 2 is a block diagram of system 200 according to some embodiments. System 200 includes shared file system 210, shared memory 220, server computers 230-1, . . . , 230-N, client(s) 240, and database 250. Database 250 is provided by a database server and is shared by server computers 230-1, . . . 230-N.

System 200 comprises an implementation of server computer 160 of FIG. 1 as a cluster of a plurality of server nodes 230-1, . . . , 230-N, each having access to shared file system 210 and shared memory 220 (e.g., distributed cache). In this distributed computing environment, data may be stored server-wide in the shared memory 220 in an external distributed cache such as Memcache, etc. Each server node 230-1, . . . , 230-N may include the architecture of server computer 160 shown in FIG. 1, or another type of architecture.

In some embodiments, a load balancer 242 handles the load on web server node(s) 244. Load balancer 242 facilitates the distribution of incoming client requests, more or less, evenly to server nodes 230-1, . . . , 230-N according some predetermined rules. Load balancer 242 may also handle application sessions. The structure and operation of load balancers are well known and, therefore, will not described in further detail.

Shared file system 210 and database 250 are embodied as non-volatile (e.g., disk-based) memory. Shared file system 210 is a part of a file system which is shared to provide access from multiple computers (e.g., server computers 230-1, . . . , 230-N) over a network. Common resources including independent language resource files 212 are persisted in shared file system 210 and accessed during operation when needed.

Server-side text information (also herein referred to as a "text message" or "text") that are to be seen by a user at client 240 (e.g., on a Web browser) is externalized in the resource files 212, one file per supported language.

The resource files (e.g., comma-separated value (CSV) files) 212 are used to store mappings between text keys and text information, pre-translated in the corresponding language. Each language has its own resource file. All the resource files contain the same keys and those keys are mapped to the same text information, pre-translated in different languages. In software code, text information to be displayed is replaced by the text key corresponding to the text information. Server-side code utilizes those text keys instead of the actual text.

Shared memory 220 is embodied as volatile (e.g., non-disk-based) memory (e.g., random access memory (RAM), static random-access memory (SRAM), and dynamic random-access memory (DRAM)), which may function as a distributed cache 220.

The distributed cache 220 is used by all the server nodes 230-1, . . . , 230-N to store and retrieve cached data for faster access by server nodes 230-1, . . . , 230-N. For example, certain language resource files may be dynamically loaded (e.g., by request) from shared file system 210 into the distributed cache 220 for quick access by a processor of application server 120.

The distributed cache 220 serves data, requested by a client 240, from the cache if it is available, or notifies the calling server regarding the absence of the requested data. In the absence of the requested data, the application at the calling server loads the requested data from the shared file system 210 and/or database 250, stores the data inside the distributed cache 220, and processes the output to the client 240.

For any subsequent requests to an application server 230 requiring the same data, the data is served from the distributed cache 220. For example, when a subsequent request which calls for the same data arrives at a different server, the server calls the distributed cache server 220 to retrieve the requested data. When the requested data is loaded into the distributed cache 220, it servers the requested data to client 240.

Generally, a server node 230-1, . . . , 230-N receives queries from client(s) 240 and provides results to client(s) 240 based on data of shared file system 210 and/or database 250.

Application server 230 provides any suitable interfaces through which client(s) 240 may communicate with an application executing on application server 230. For example, application server 230 may include a HyperText Transfer Protocol (HTTP) interface supporting a transient request/response protocol over Transmission Control Protocol (TCP), a WebSocket interface supporting non-transient full-duplex communications between application server 230 and any client(s) 240 which implement the WebSocket protocol over a single TCP connection, and/or an Open Data Protocol (OData) interface.

Presentation of a user interface may comprise any degree or type of rendering, depending on the type of user interface code generated by application server 230. For example, a client 240 may execute a Web browser to request and receive a Web page (e.g., in HTML format) from application server 230 via HTTP, HTTPS, and/or WebSocket, and may render and present the Web page according to known protocols. One or more of client(s) 240 may also or alternatively present user interfaces by executing a standalone executable file (e.g., an .exe file) or code (e.g., a JAVA applet) within a virtual machine.

Figure 3:
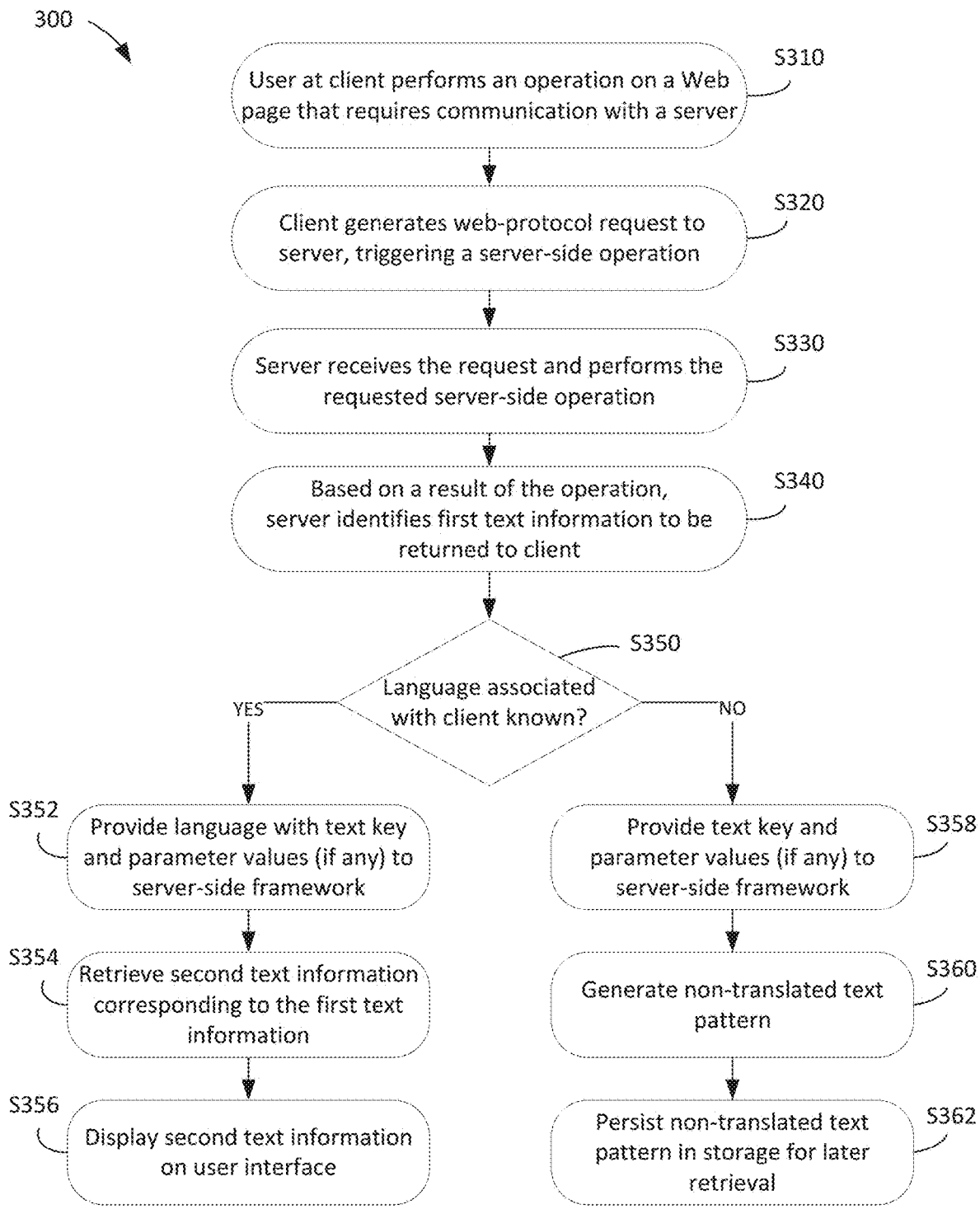
FIG. 3 is a flow diagram illustrating localization workflows according to some embodiments.

FIG. 3 is a flow diagram illustrating localization workflows 300 according to some embodiments.

Initially, at S310, a user (e.g., a Web user), uses a Web browser at a client to perform an operation on a Web page that requires communication with a server. The client may include any type of computing device such as a laptop, a tablet, a mobile phone, an appliance, a desktop computer, and the like.

In response, at S320, the client (Web browser) generates a web-protocol (e.g., Representational State Transfer (REST)) request to a server, and a server-side operation is triggered in response to the request. In some embodiments, the request may include information regarding a language associated with the client.

At S330, the server receives the request and performs the requested server-side operation. Based on a result of the operation, the server, at S340, identifies first text information to be returned to the client.

Instant Localization

Some user actions (e.g., a request to update a database record; a request purchase a catalog item) trigger server-side operations, demanding a response (e.g., text/message notifications) from the server that is shown on a user interface as soon as the operations are completed.

When a language associated with the client is known at the time of text generation (e.g., of first text information), at S350, such instant localization may be performed, at S352-S356.

At S352, the server application invokes an API of the server-side i18n framework 124 (also herein referred to as "framework"), providing the language associated with the client along with the i18n text key associated with the first text information. The text key may be acquired using the corresponding language resource file. As described above, the resource file would include mappings between text keys and text information, pre-translated in the corresponding language. Thereby, using the first text information, the text key corresponding to the first text information may be searched in the resource file, and acquired.

Additionally, the first text information may include parameterized text. In such a case, at S352, any parameter values associated with the first text information are also provided to the framework.

The framework processes this information in accordance with the process described in detail below with reference to FIG. 4. The framework API returns second text information (e.g., translated text information) corresponding to the first text information to the client.

At S358, a web-protocol response containing the second text information is returned to the client (Web browser). At S356, the second text information is displayed on a user interface for a user to view.

Generating Localizable Raw Text Patterns

Other user actions (e.g., uploading a file for processing and validation) trigger server-side operations, demanding a response from the server that is not shown immediately on the user interface because, for example, the user locale is unknown at the time of text generation (e.g., of first text information). Rather, the messages are persisted and can be shown at a later stage, when the user requests them.

In an example embodiment, when a language associated with the client is not known at the time of text generation, at S350, localizable raw text patterns may be generated, at S358-362, which are localized (translated) at a later time when the user requests a result of the operation.

At S358, the server application invokes an API of the server-side i18n framework 124, providing the i18n text key associated with the first text information. Additionally, in a case where the first text information includes parameterized text, at S358, any parameter values associated with the first text information are also provided to the framework.

At S360, the framework processes this information and creates a raw (non-translated) text pattern (e.g., a concatenation of the text key with the parameter values (if any)) which, in S362, is persisted (e.g., in a file system or database) for later retrieval.

Localizing the Raw Text Patterns

In some embodiments, the persisted raw text patterns from S362 are retrieved when a user requests a report for the server-side operation executed with the workflow in S358-362, for which a response from the server was not shown immediately on the user interface.

The client (Web browser) sends a web-protocol request to the server, providing a language associated with the client.

The raw text patterns persisted by S362 are retrieved, and the server application invokes an API of the server-side i18n framework 124, providing the language associated with the client along with the raw text patterns (e.g., concatenation of the text key with the parameter values (if any)).

The framework processes this information in accordance with the process described in detail below with reference to FIG. 4 and generates second text information (e.g., translated text information) which corresponds to the first text information based on the language associated with the client, and the text key and parameter values in raw pattern.

A web-protocol response containing the second text information is returned to the client (Web browser) and the second text information is displayed on a user interface for a user to view.

Figure 4:
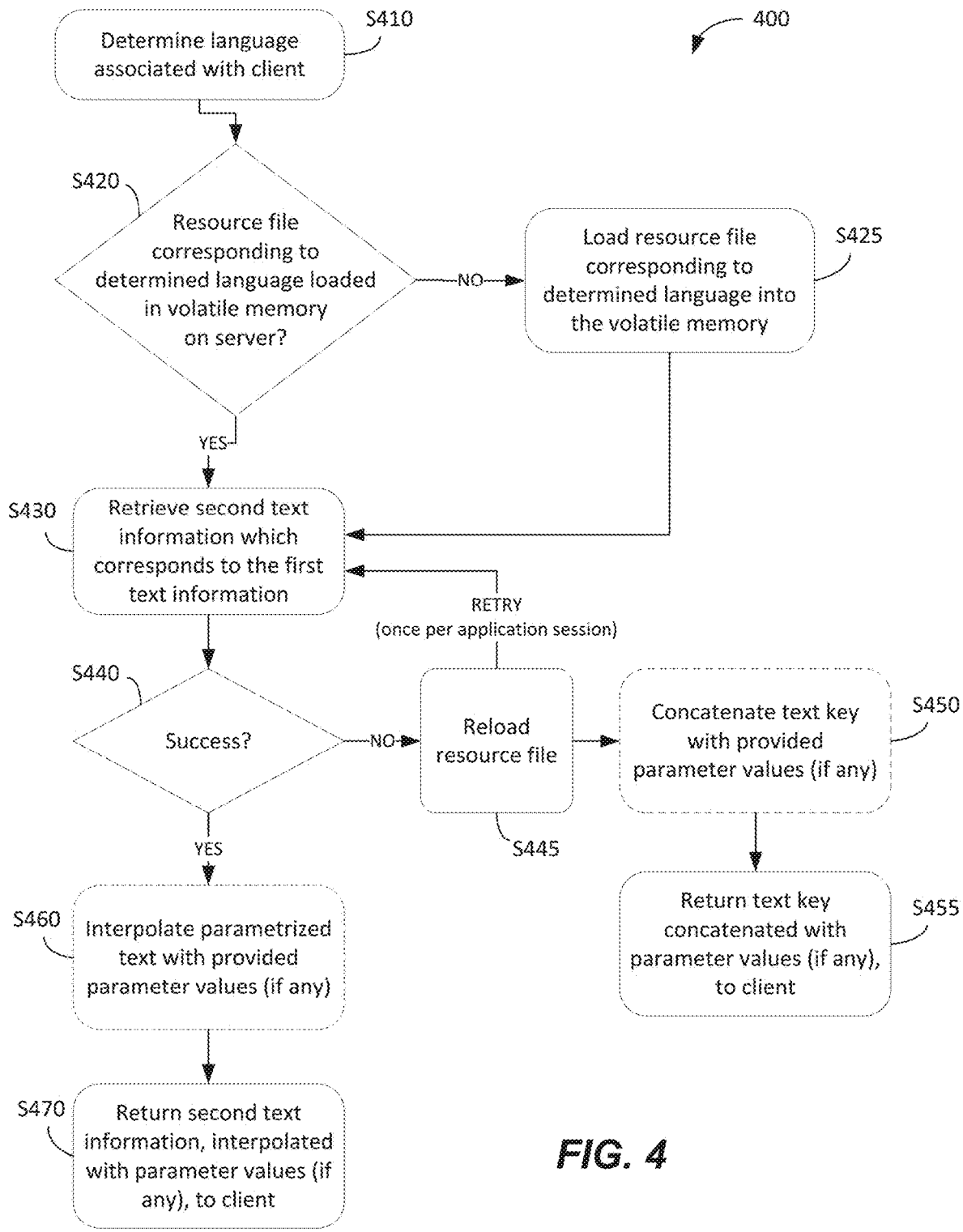
FIG. 4 is a flow diagram illustrating an exemplary process of the framework according to some embodiments.

FIG. 4 is a flow diagram illustrating an exemplary process 400 for implementing a framework 124 of FIG. 1 in some embodiments. Process 400 facilitates the internationalization of server-side text information according to some embodiments.

Initially, at S410, the server-side i18n framework determines a locale, including attributes such as language, to associate with the client. In some embodiments, currency attributes associated with the client, including an appropriate format, may also be identified.

In some embodiments, the language is determined, at S410, by approximating the language to one that is supported by the application. The approximated language may be computed by rule. For example, if a user requests Argentinian Spanish and the framework supports only Spain Spanish or generic Spanish, the framework will employ one of the supported languages. In a case where the language associated with the client is unsupported or unknown (e.g., no specific language was requested), the framework falls back to a default language.

In some embodiments, the server determines the language associated with the client based on information contained in a field in the hypertext transfer protocol (HTTP) header of the client's request, such as in an "Accept-Language" header field.

The Accept-Language header specifies the language preference(s) of a client, including which locale variant is preferred. Basic language values are represented by a two character language code, indicating the language (e.g., "en" for English, "es" for Spanish, "de" for German, "pt" for Portuguese, and "ja" for Japanese). Location-specific values are expressed in a two-part format indicating the language and the country where the version of the language is used (e.g., "pt-BR" for Portuguese as spoken in Brazil, "es-AR" for Spanish as spoken in Argentina, and "es-ES" for Spanish as spoken in Spain). The Accept-Language header returns one or more languages in the header that tells the Web server which language(s) the browser prefers to receive text information.

Other ways of determining the language associated with are possible. In some embodiments, the language may be established by the user via, for example, language settings of the Web application. In some embodiments, the language may be established by the user via, for example, Web browser settings of the client.

At S420, the framework determines whether a resource file corresponding to the determined language in S410 is loaded in a volatile memory on the server. If so, at S430, the request is routed to the volatile memory and the framework retrieves, from the resource file in the volatile memory, second text information (e.g., translated text information) which corresponds to the first text information to be returned to the client.

In a case where the resource file corresponding to the determined language is not loaded in the volatile memory on the server, the request is routed to a non-volatile memory (e.g., file system) and the framework, at S425, attempts to load the resource file (e.g., mappings between text keys and translated texts) corresponding to the determined language, from the non-volatile memory into the volatile memory on the server, and the process proceeds to step S430.

In some embodiments, the resource file, after being loaded into the volatile memory, persists in the volatile memory until the end of an application session. If the application is not restarted, the loaded languages will remain in the volatile memory.

At S440, if the retrieval, from the resource file in the volatile memory, of the second text information which corresponds to the first text information to be returned to the client is successful, the second text information is returned to the client at S470.

In some embodiments, if the second text information could not be retrieved, the framework, at S445, attempts to reload the resource file.

Reloading occurs, for example, in situations of production redeployment when a new version of an application in a production environment is redeployed without stopping the deployed application or otherwise interrupting the application's availability to clients. In such a case, the resource files in the new version are changed, but the added or changed texts are not updated in the volatile memory. The reloading step S445 updates an older version of the resource file to the new version and step S430 is then retried. This reloading step is preferably executed once per application session.

If after reloading, the second text information which corresponds to the first text information still could not be retrieved from the resource file and respectively in the corresponding cache, the framework may, at S455, return a raw text pattern to the client, for example, the text key associated with the text information to be returned to the client.

In a case where the first text information includes parameters, steps S450 and S460 are executed. Otherwise, those steps are skipped and the process proceeds to the corresponding following step.

The framework, at S460, interpolates the parametrized text with the provided parameter values and at S470, returns the second text information, interpolated with any parameter values.

Alternatively, if the second text information could not be retrieved, the framework, at S450, concatenates the text key with the provided parameter values and at S455, returns the text key concatenated with any parameter values to the client. For example, a text key for "Requested quantity for {{item_id}} is not available" is concatenated with the parameter value for "item_id" as follows:

TEXT_REQSTD_QNTY_FOR_ITM_NA|ITEM12345

This concatenated text key and parameter value may be displayed on a user interface for a user to view.

Alternatively, an error message may be returned to the client when the reloading step S445 and subsequent retrieval step at S430 fail.

Figure 5:
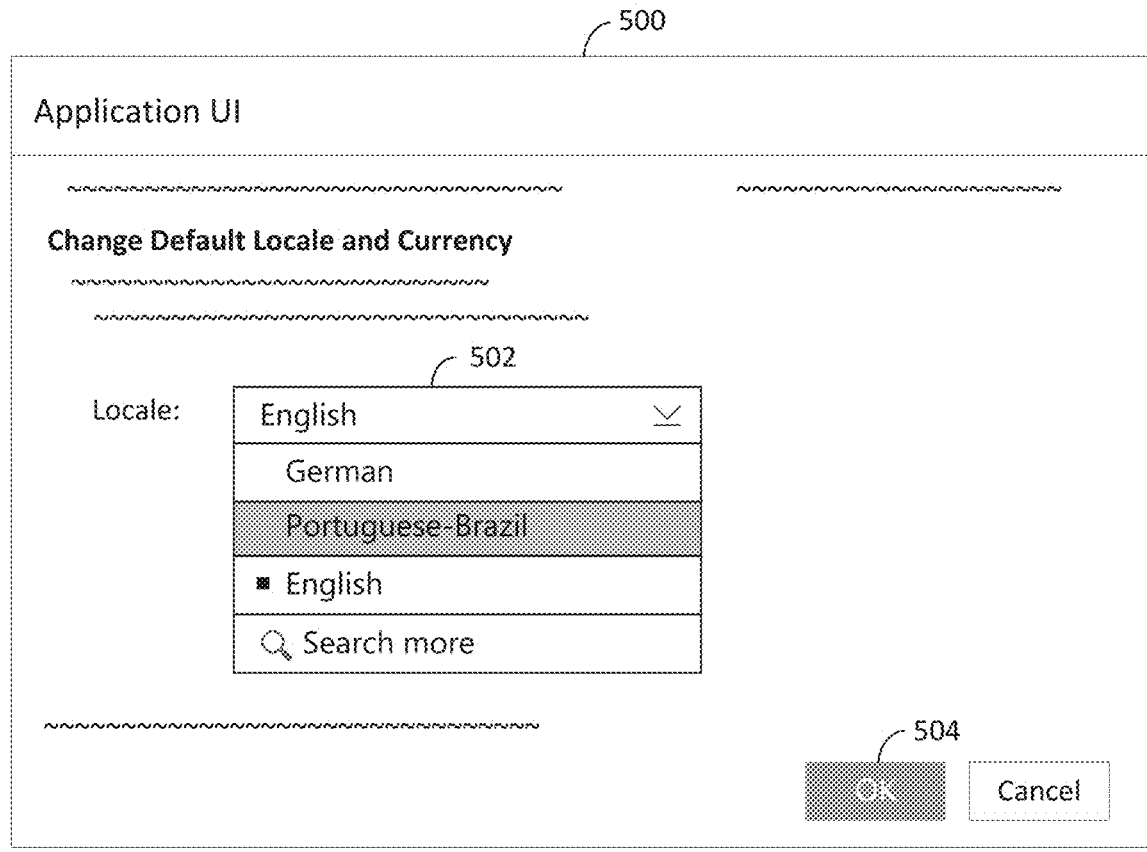
FIGS. 5 and 6 are outward views of a user interface according to some embodiments.
Figure 6:
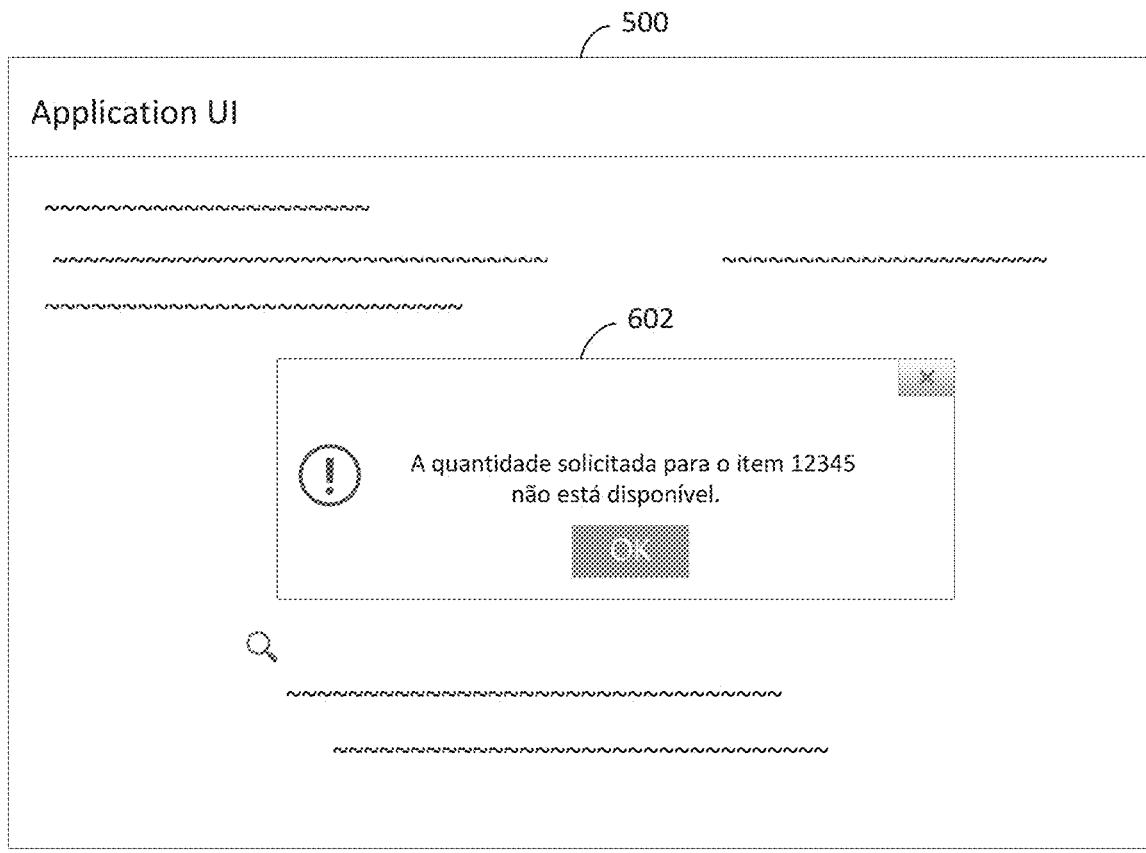

FIGS. 5 and 6 are outward views of a user interface 500 according to some embodiments. Interface 500 may be presented on any type of display apparatus (e.g., desktop monitor, smartphone display, tablet display) provided by any type of client (e.g., desktop system, smartphone, tablet computer). The application which is executed to provide interface 500 may comprise a Web browser, a standalone application, or any other application. Embodiments are not limited to interface 500, and may include user interfaces having any particular type, format, or function.

In some embodiments, user interface 500 can present a user with a number of different language options for translating text information. For example, the user may select a supported language from a drop down menu 502 of supported languages for which to view content in. In the present example, a language option "Portuguese-Brazil" (i.e., Portuguese as spoken in Brazil) is selected. After the selection of an "OK" control 503, subsequent text information appearing on the user interface seen by the user will be displayed in the requested language, in this case, Brazilian Portuguese.

As a result of an operation, user interface 500 may be presented in which a message 602 shown in FIG. 6 for "Requested quantity for {{item_id}} is not available" is displayed in the Brazilian Portuguese language as "A quantidade solicitada para o item 12345 não está disponível" in accordance with the user's language preference at 502. In this example, the text information includes parameterized text, which is translated and interpolated such that the parameter value "1234" associated with the parameterized text is put in place of the parameter "item_id" in the translated text.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

Figure 7:
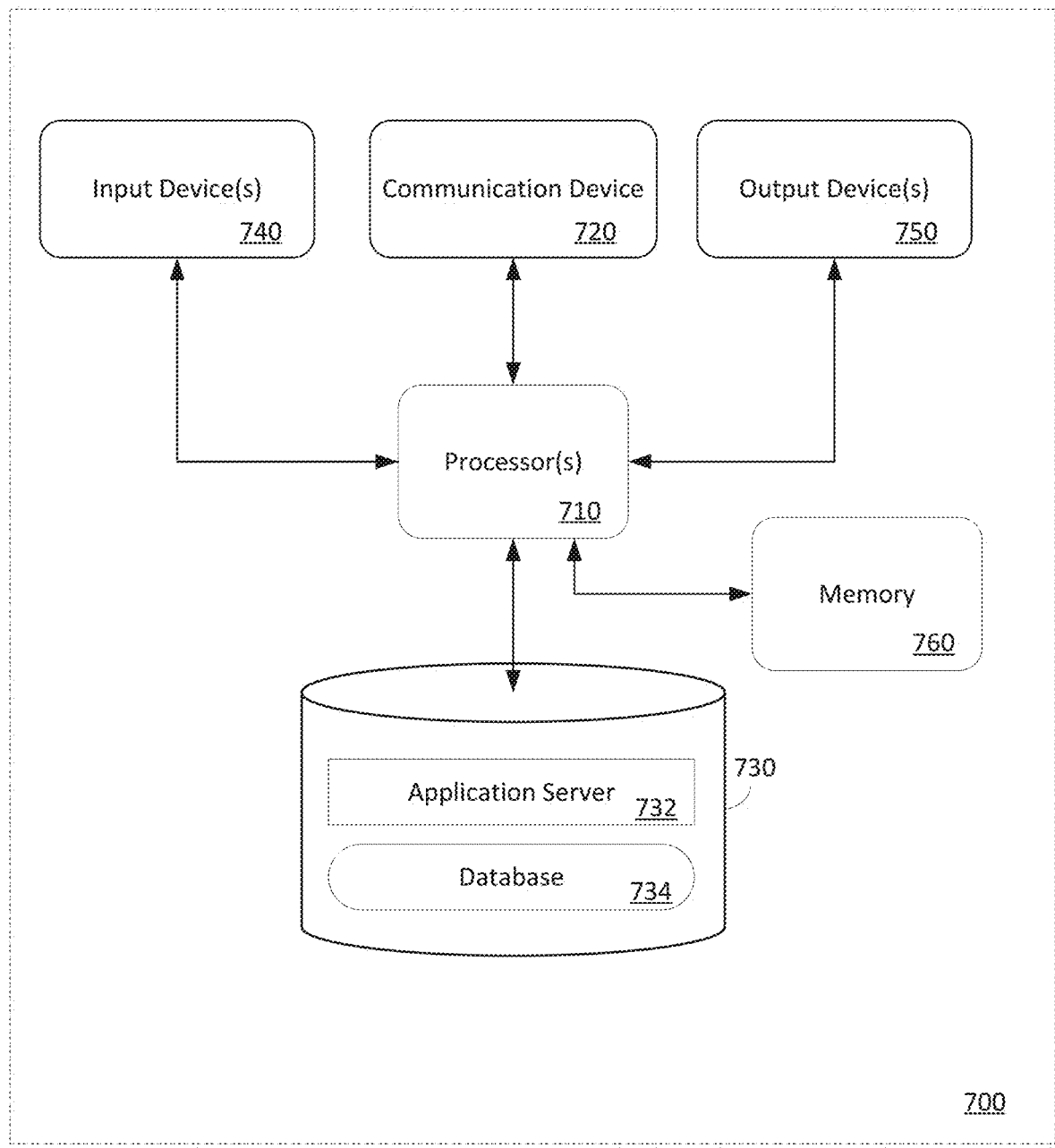
FIG. 7 is a block diagram of an apparatus according to some embodiments.

FIG. 7 is a block diagram of apparatus 700 according to some embodiments. Apparatus 700 may comprise a general- or special-purpose computing apparatus and may execute program code to perform any of the functions described herein. Apparatus 700 may comprise an implementation of one or more elements of system 100. Alternatively, apparatus 700 may comprise an implementation of one or more elements of system 200. Apparatus 700 may include other unshown elements according to some embodiments.

Apparatus 700 includes processor 710 operatively coupled to communication device 720, data storage device/memory 730, one or more input devices 740, one or more output devices 750 and memory 760. Communication device 720 may facilitate communication with external devices, such as an application server 732. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to manipulate graphical user interfaces and to input information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM).

Application server 732 may comprise program code executed by processor 710 to cause apparatus 700 to perform any one or more of the processes described herein. Embodiments are not limited to execution of these processes by a single apparatus. Database 734 may include database data as described above. As also described above, database data (either cached or a full database) may be stored in volatile memory such as memory 760. Data storage device 730 may also store data and other program code for providing additional functionality and/or which are necessary for operation of apparatus 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computer-implemented method comprising:
  receiving, at a server, a web-protocol request from a client device, wherein the web-protocol request is a Representation State Transfer (REST) request;
  triggering a server-side operation in response to the request;
  identifying, based on a result of the operation, first text information to be returned to the client device, wherein a text key corresponds to the first text information, and in code used by the server, the first text information is replaced with the text key;
  determining a language associated with the client device based on at least one of:
    a language specified in the web-protocol request, and
    a supported language that is an approximation of the language specified in the web-protocol request, wherein the approximation is determined based on a set of rules;
  determining whether a resource file corresponding to the determined language is loaded in a volatile memory on the server, wherein the resource file stores a mapping between the text key, first text information and second text information;

loading a resource file corresponding to the determined language, from a non-volatile memory into the volatile memory, in a case where the resource file corresponding to the determined language is not loaded in the volatile memory;

retrieving, from the resource file in the volatile memory, and based on the text key, second text information which corresponds to the first text information to be returned to the client device; and transmitting the second text information to the client device, wherein the first text information includes parametrized text, and further comprising, prior to transmitting the second text information to the client device, retrieving, from the non-volatile memory, a parameter value corresponding to the first text information to be returned to the client device; and interpolating the parameterized text with the parameter value.

2. The method of claim 1, wherein the language associated with the client device is determined further based on a default language.

3. The method of claim 1, wherein, in a case where the language associated with the client device is unsupported or unknown, the language is determined to be a default language.

4. The method of claim 1, further comprising, prior to transmitting the second text information to the client device, determining whether the second text information was successfully retrieved from the volatile memory; and in response to a determination that the second text information could not be retrieved, reloading the resource file into the volatile memory.

5. The method of claim 4, wherein the first text information includes parameterized text.

6. The method of claim 1, further comprising, prior to transmitting the second text information to the client device, retrieving, from the non-volatile memory, a parameter value corresponding to the first text information to be returned to the client device;

interpolating the parametrized text with the parameter value in a case where the second text information was successfully retrieved from the volatile memory; and concatenating a corresponding text key from the resource file with the parameter value in a case where the second text information could not be retrieved from the volatile memory.

7. The method of claim 1, wherein the server is a cluster of a plurality of server nodes, each having access to a shared volatile memory.

8. A system for facilitating server-side internationalization of a web application, the system comprising:

a server having a processor and a volatile memory;

a client device having a browser for accessing the server over a network;

an application framework executable in the server, coupled to at least one application by an application programming interface and arranged to access the volatile memory, wherein, when executed, the application framework performs the operations of:

receiving, at a server, a web-protocol request from a client device, wherein the web-protocol request is a Representation State Transfer (REST) request;

triggering a server-side operation in response to the request;

identifying, based on a result of the operation, first text information to be returned to the client device, wherein a text key corresponds to the first text information, and in code used by the server, the first text information is replaced with the text key;

determining a language associated with the client device based on at least one of:

a language specified in the web-protocol request, and a supported language that is an approximation of the language specified in the web-protocol request, wherein the approximation is determined based on a set of rules;

determining whether a resource file corresponding to the determined language is loaded in a volatile memory on the server, wherein the resource file stores a mapping between the text key, first text information and second text information;

loading a resource file corresponding to the determined language, from a non-volatile memory into the volatile memory, in a case where the resource file corresponding to the determined language is not loaded in the volatile memory;

retrieving, from the resource file in the volatile memory, and based on the text key, second text information which corresponds to the first text information to be returned to the client device; and transmitting the second text information to the client device, wherein the first text information includes parametrized text, and further comprising, prior to transmitting the second text information to the client device, retrieving, from the non-volatile memory, a parameter value corresponding to the first text information to be returned to the client device; and interpolating the parameterized text with the parameter value.

9. The system of claim 8, wherein the language associated with the client device is determined further based on a default language.

10. The system of claim 8, wherein, in a case where the language associated with the client device is unsupported or unknown, the language is determined to be a default language.

11. The system of claim 8, prior to transmitting the second text information to the client device, determining whether the second text information was successfully retrieved from the volatile memory; and in response to a determination that the second text information could not be retrieved, reloading the resource file into the volatile memory.

12. The system of claim 11, wherein, wherein the first text information includes parameterized text.

13. The system of claim 10, further comprising, prior to transmitting the second text information to the client device, retrieving, from the non-volatile memory, a parameter value corresponding to the first text information to be returned to the client device;

interpolating the parametrized text with the parameter value in a case where the second text information was successfully retrieved from the volatile memory; and concatenating a corresponding text key from the resource file with the parameter value in a case where the second text information could not be retrieved from the volatile memory.

14. The system of claim 8, wherein the server is a cluster of a plurality of server nodes, each having access to a shared volatile memory.

15. A non-transitory computer readable medium having stored therein instructions that when executed cause a computer to perform a method comprising:
- receiving, at a server, a web-protocol request from a client device, wherein the server includes a plurality of server nodes, each having access to a volatile memory, and the web-protocol request is a Representation State Transfer (REST) request;
- triggering a server-side operation in response to the request;
- performing, via the server, the server-side operation to generate a result to the web-protocol request;
- identifying, based on a result of the operation, first text information to be returned to the client device, wherein a text key corresponds to the first text information and in code used by the server, the first text information is replaced with the text key;
- determining a language associated with the client device based on at least one of:
  - a language specified in the web-protocol request, and
  - a supported language that is an approximation of the language specified in the web-protocol request, wherein the approximation is determined based on a set of rules;
- determining whether a resource file corresponding to the determined language is loaded in a volatile memory on the server, wherein the volatile memory is a shared memory, and the resource file stores a mapping between the text key, first text information and second text information;
- loading a resource file corresponding to the determined language, from a non-volatile memory into the volatile memory, in a case where the resource file corresponding to the determined language is not loaded in the volatile memory;
- retrieving, from the resource file in the volatile memory, and based on the text key, second text information which corresponds to the first text information to be returned to the client device; and
- transmitting the second text information to the client device,
- wherein the first text information includes parameterized text, and further comprising, prior to transmitting the second text information to the client device,
  - retrieving, from the non-volatile memory, a parameter value corresponding to the first text information to be returned to the client device; and
  - interpolating the parameterized text with the parameter value.

16. The non-transitory computer-readable medium of claim 15, wherein, in a case where the language associated with the client device is unsupported or unknown, the language is determined to be a default language.

17. The non-transitory computer-readable medium of claim 15, prior to transmitting the second text information to the client device, determining whether the second text information was successfully retrieved from the volatile memory; and
- in response to a determination that the second text information could not be retrieved, reloading the resource file into the volatile memory.

* * * * *